455-606 EX

OR 2,494,645

EXAMINER

Jan. 17, 1950 M. E. COLLINS 2,494,645

TWO-WAY LIGHT COMMUNICATION SYSTEM

Filed Sept. 15, 1944 2 Sheets-Sheet 1

Complete Station for light signalling includes telescope & for directing it; so that sharply defined beams both properly oriented in when telescopes are aligned. R lens facing $T_2$ and T lens facing $R_2$ Transmitter includes galvanometer type modulator

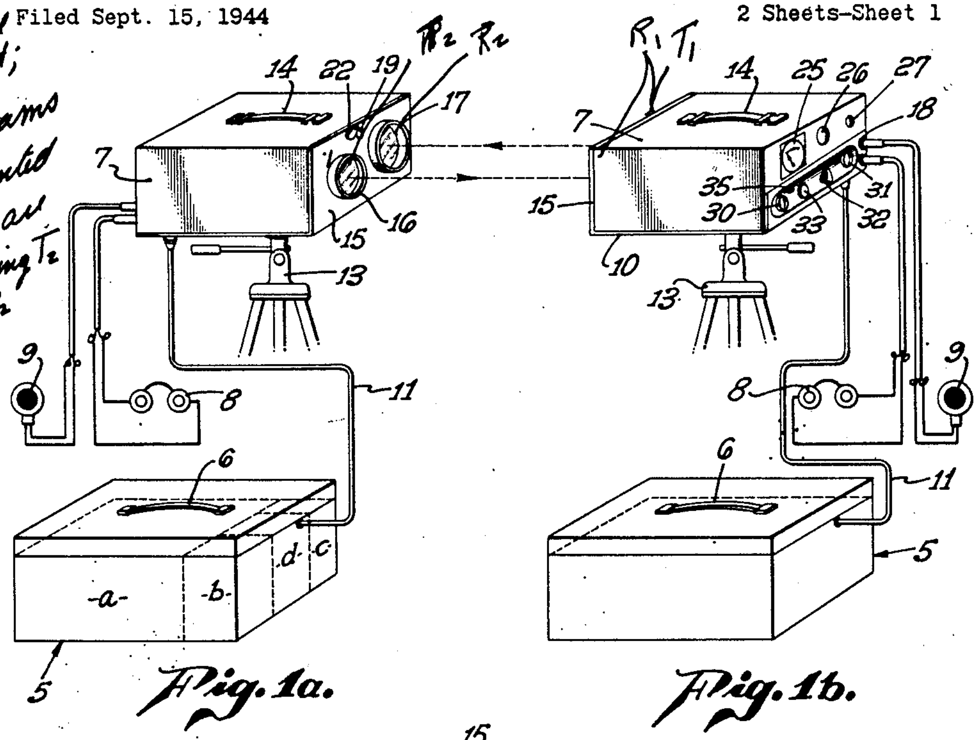

Fig. 1a. Fig. 1b.

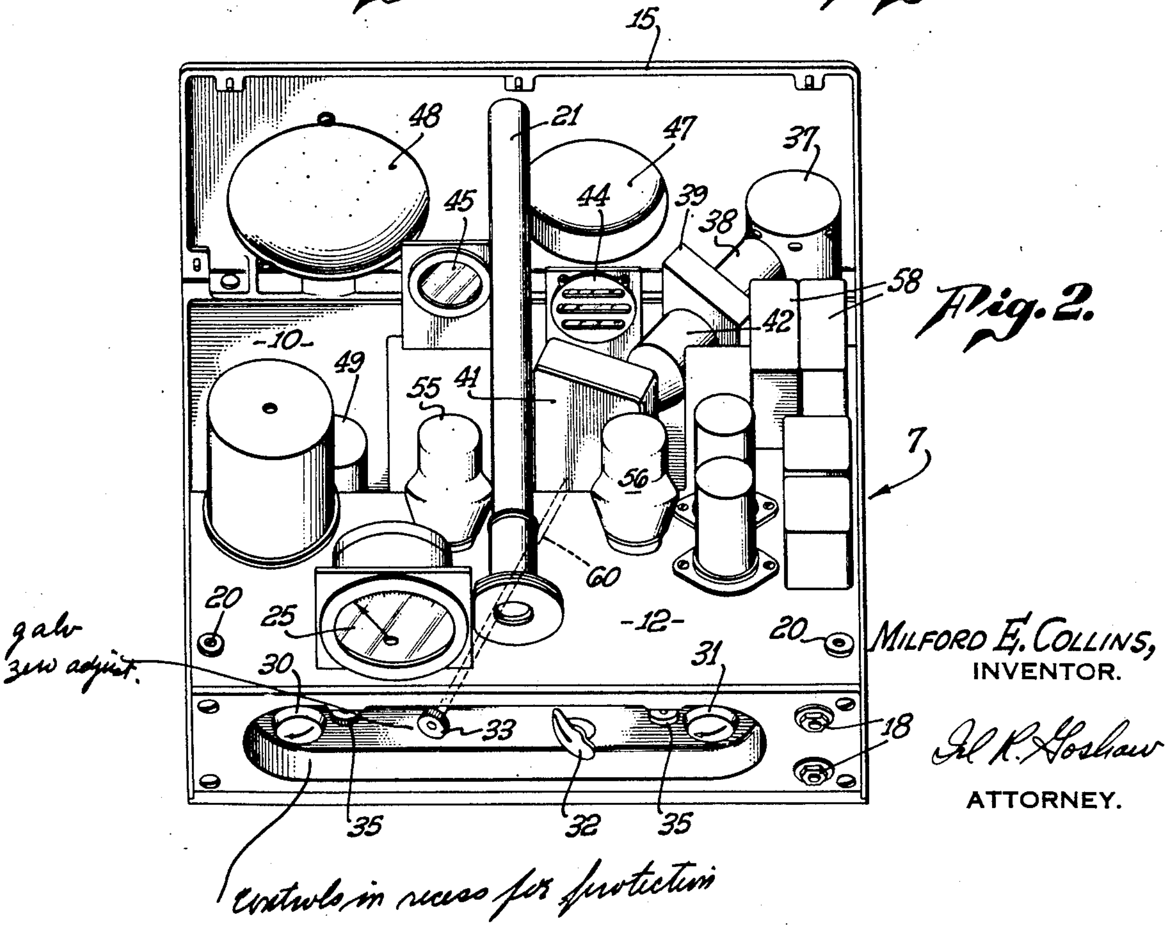

Fig. 2.

galv 3-w adjust controls in recess for protection

MILFORD E. COLLINS, INVENTOR.

ATTORNEY.

EXAMINER

TWO-WAY LIGHT COMMUNICATION SYSTEM

Filed Sept. 15, 1944 2 Sheets-Sheet 2

MILFORD E. COLLINS,
INVENTOR.

BY Gel R. Goshaw

ATTORNEY.

EXAMINER

Patented Jan. 17, 1950

2,494,645

UNITED STATES PATENT OFFICE 2,494,645

TWO-WAY LIGHT COMMUNICATION SYSTEM

Milford E. Collins, Los Angeles, Calif., assignor to Radio Corporation of America, a corporation of Delaware Application September 15, 1944, Serial No. 554,246

4 Claims. (Cl. 250—7)

Figure 3:
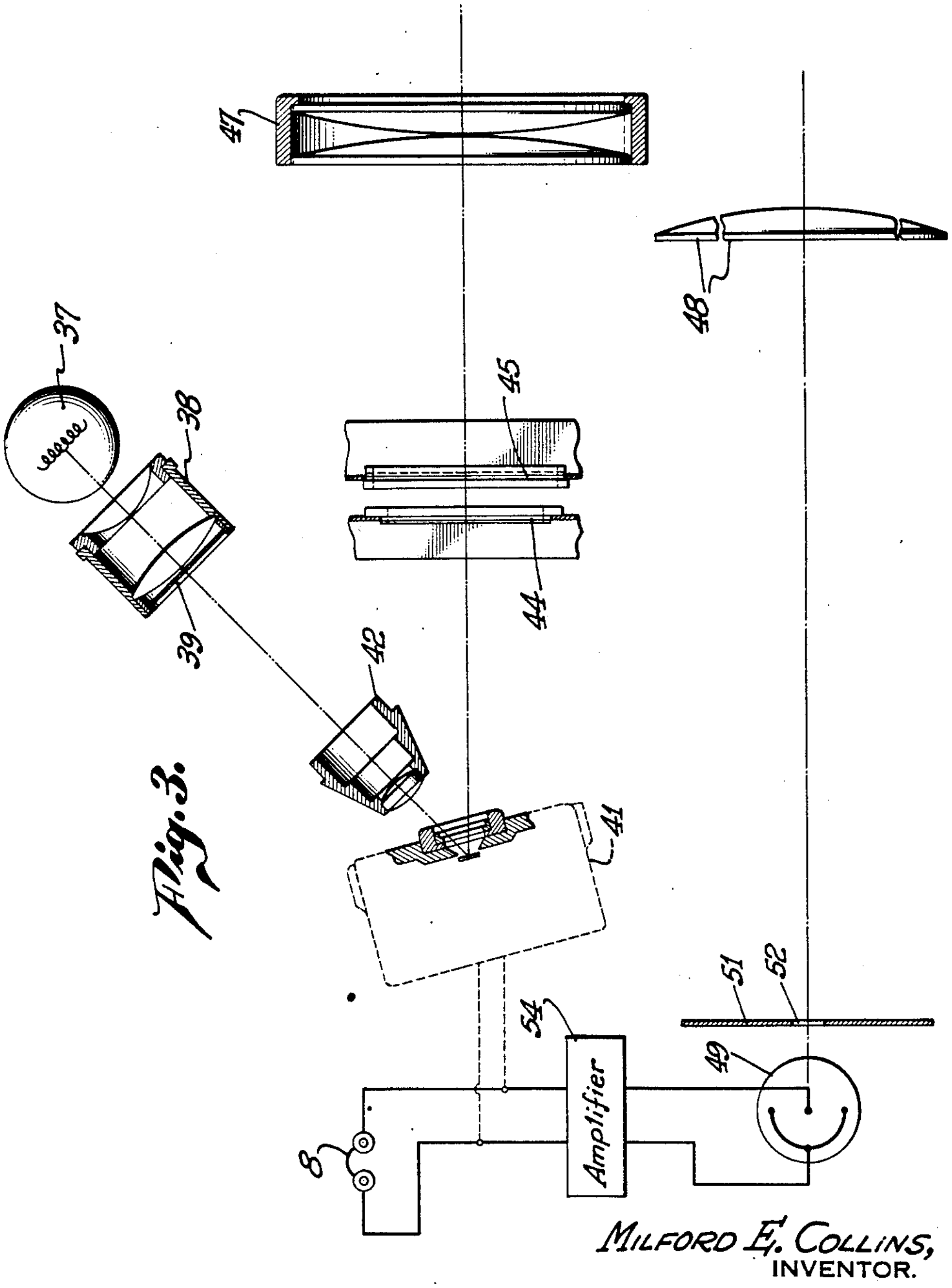

This invention relates to communication systems, and particularly to a communication system utilizing light as the conducting or transmission medium.

The art of communication by light is old, as evidenced by Bell Patent No. 235,199 of December 7, 1880. There have been numerous improvements made to such systems since this disclosure, however, these improvements have been principally in the modulating and detecting elements. The present invention is directed to a particularly efficient and simplified light beam communication system utilizing the most sensitive of present known elements. The transmitter and receiver is an integral unit which is not only rugged, but is in portable form wherein the equipment may be readily carried into places inaccessible to the majority of similar equipment.

The chief features of the invention are the compactness of the transmitter and receiver optical units, their arrangement, and the controls which facilitate the aligning of two units with one another for operation. The minimum of controls are employed without eliminating necessary adjustments. The entire transmitting and receiving unit together with its microphone, headset and spare parts, except for the tripod, may be enclosed in a single container, the unit being removed therefrom during operation, while the container houses the energy supply, such as a primary battery.

The principal object of the invention is to facilitate communication between two distant points by means of modulated light.

Another object of the invention is to provide an improved system for light beam communication.

A further object of the invention is to provide an easily portable light beam communication unit which is of light weight, rugged, and readily set up for operation.

A still further object of the invention is to provide a light beam communication unit which is simple in operation and readily adjustable.

Although the novel features which are believed to be characteristic of this invention will be pointed out with particularity in the appended claims, the manner of its organization and the mode of its operation will be better understood by referring to the following description read in conjunction with the accompanying drawings forming a part hereof in which:

Figs. 1*a* and 1*b* show two units embodying the invention set up for communication.

Fig. 2 is a perspective view of a combined transmitting and receiving unit with the cover removed, and Fig. 3 is a diagrammatic view showing the optical elements of the transmitter and receiver and their relationship to one another.

Referring now to Figs. 1*a* and 1*b* in which identical units in each figure are given like numerals, a carrying case 5 of metal or other suitable material having a handle 6 is divided into compartments in which a combined transmitting and receiving unit 7 is accommodated in the largest compartment *a*, a pair of headphones 8, a microphone 9 and power cable 11 are accommodated in compartment *b*, spare tubes, lamps, and tools are accommodated in compartment C, and a primary energizing battery is housed in compartment *d*. As shown in Figs. 1*a* and 1*b*, each unit is adapted to operate on a universal head tripod 13 which may be carried in a separate container, such as leather or canvas carrying case. The unit 7 has a handle 14 for lifting it in and out of the case 5. As shown in Figs. 1*a* and 1*b*, the power cable is connected from the battery in compartment *d* to a plug in the bottom of the unit, while headset 8 and microphone 9 are plugged into respective jacks 18 in the front of the unit as shown in Fig. 1*b*.

The main frame of each unit consists of a casting having a bottom plate 10 upon which are mounted the optical elements, modulator, and cell of the transmitter and receiver. An amplifier assembly 12 is mounted on the rear portion of the plate 10 and fastened thereto by screws 20, this assembly having the control panel. The casting has a front wall section 15 in which are cylindrical extensions 16 and 17 for mounting a transmitting lens and a receiving lens. A U-shaped cover extends over the sides and top and the upper portion of the rear of the unit, the optical and amplifier elements of the unit being shown in Fig. 2 when the cover is removed. An opening 19 is positioned above and between the lenses through which the unit is aligned with its associated unit by means of a telescope 21. A sliding cover 22 may be positioned over the opening 19 when the unit is not in use.

The section of the cover over the control panel has three openings. Through a large opening at the left, a meter 25 on the amplifier assembly for indicating the current to the transmitting lamp can be observed, while a central opening 26 permits the telescope 21 to be sighted. The third opening 27 in the cover permits the galvanometer to be monitored. The control panel is recessed within the front wall of the amplifier assembly, the control elements consisting of a potentiometer knob 30 for controlling the amplification of the received signal, a knob 31 for controlling the amount of energization of the transmitting lamp, a switching knob 32 for controlling the energizing of the amplifier and lamp and for translating the amplifier into a test oscillator, an adjusting knob 33 for the galvanometer, and cover fastening screws 35. These elements are shown clearly in Fig. 2.

The particular circuit used with these units is disclosed and claimed in copending application, Ser. No. 551,125, filed August 25, 1944, now Patent No. 2,421,468, granted June 3, 1947.

Referring now to Fig. 3, the arrangement of the optical elements of the transmitter and receiver is illustrated. Light from a lamp 37 is collected by an optical unit 38 in which is located an imaging grid 39. Emergent light from the grid 39 is projected on the mirror of a light modulating galvanometer 41 by a lens unit 42, the light being reflected to a projection grid 44. A filter 45 may or may not be employed in the optical path. The light passing the grid 44 is projected to the distant station by a projection lens unit 47. The optical elements of the receiving system consists simply of a receiving lens 48 which collects light for impression upon a photoelectric cell 49 which is shielded by an iris 51. The disposition of these elements on the unit is shown in Fig. 2 wherein the same elements are given the same numerals.

The projection lens 47 consists of two plano-convex lenses of 3" diameter and 12" focal length. The modulating galvanometer is of the balanced armature, moving mirror type which has been given maximum sensitivity by employing an armature of minimum weight and stiffness compatible with the necessary stability. The transmitting optical elements including elements 38, 42, and 47, are so arranged that the filament is imaged on the mirror of the modulator 41, while the imaging grid 39 is focused on the projection grid 44, the projection lens 47 being located so as to re-image the filament at 1000 yards, providing a beam approximately one degree wide to provide a uniform light intensity within an area of approximately 17 yards in diameter at this distance from the unit. The filter 45 is of the infrared type, which may be moved in or out of the projected beam so as to provide infrared or white light transmission. The grids at 39 and 44 have three horizontal openings as illustrated in Fig. 2, for the purpose of obtaining maximum increases and decreases in light for minimum movement of the galvanometer mirror. The ratio of the size of the grid 39 with respect to the grid 44 is substantially 1.2 to 1. Fifty percent of light is transmitted at no signal.

The receiving lens 48 is an F—2, with 8" focal length and 4" diameter, while the photocell is preferably an RCA921 type located approximately 7½ inches from the lens 48. This distance permits the positioning of the cell slightly behind the focal point of the lens 48, an iris plate 51 having a $\frac{1}{16}$ of an inch opening 52 being provided in the focal plane for the purpose of eliminating light static from the cell. The opening 52 is variable so that it may be increased in size for the purpose of tolerating some misalignment of the two stations. A larger opening also aids in aligning the stations. The receiving portion of the system utilizes a three-stage amplifier 54 shown connected to the cell 49, the output of the amplifier being impressed on the headphones 8 during signaling and upon the galvanometer 41 during testing and aligning, as described in detail in the above mentioned copending application. Elements of the above sizes and values will provide the maximum in performance commensurate with portability primarily determined by the total weight of the entire system.

The arrangement of the various amplifier and optical elements are shown in Fig. 2. Vacuum tubes are shown at 55 and 56, biasing batteries at 58, while transformers and condensers are distributed as shown, the wiring being within the amplifier assembly. As shown by dotted lines 60 representing a rod threaded in the galvanometer support, the knob 33 controls the tilt of the galvanometer so that it may be adjusted to no signal position whereby one-half of the light passes the grid 44. As mentioned above, the switch knob 32 controls a multiple switch described in detail in the above mentioned copending application for transforming one of the amplifier stages into an oscillator for the purpose of generating a substantially 1000 cycle tone which is impressed on the galvanometer 41. The light beam is thus modulated for purpose of permitting the final alignment of the two stations which may be roughly aligned by the telescope 21. When the alignment is proper, maximum signal is received in the earphones during the transmission of the generated tone. The operator may then lock his unit in place on the tripod 13 and adjust the gain of the amplifier by knob 30 to the desired operating position.

If both amplifiers operated in oscillator position, neither station could receive the other, consequently before aligning the two stations, an agreement should be established between operators as to which of the two stations will send the 1000 cycle tone and which will receive it. One practical method of operation is to have one station and its 1000 cycle tone for some predetermined length of time to permit the other station to line up for optimum reception, and then to reverse the order to permit the other station to similarly adjust its unit. In this manner, the two stations may be aligned very quickly. If, during operation, reception becomes faulty, the switch 32 may be turned to oscillator position to make a rapid test check on the performance of the units.

When it is desired to set up a station, it is only necessary to remove the unit 7 from its carrying case 5 and mount it on the tripod 13 while the battery cable 11, which is already connected to the battery, can be quickly plugged into the connector located in the bottom of the unit. The microphone and headphones are then plugged into the jacks 18 in the control panel. The rheostat is then turned to its "on" position, the rotary switch turned to energizing position, and the galvanometer 41 adjusted so that 50 percent of the light through the imaging grid 39 is transmitted through the projection grid 44. If it is desired to transmit with infrared light, the infrared filter 45 may be moved between the projection grid 44 and the lens 47.

I claim as my invention:

1. A two-way light beam communication unit comprising a box housing, a pair of lenses mounted on an extended front wall of said housing, a source of light, a galvanometer, a photoelectric cell, and an amplifier mounted on the upper side of said housing, a volume control for said amplifier and a lamp energizing control mounted on the rear wall of said housing, sighting means for said unit, and a cover for en-

EXAMINER closing said amplifier, said light source, said galvanometer, said photoelectric cell, and said sighting means.

2. A unit in accordance with claim 1 in which one of said lenses is adapted to project light from said galvanometer to a distant unit and said other lens is adapted to collect light from said distant unit for impression on said photoelectric cell, the axes of said lenses being substantially parallel and simultaneously adjustable.

3. A two-way light beam communication system, comprising a rectangularly shaped housing, a pair of lenses mounted in a front wall of said housing, a light source, a modulator, said modulator reflecting a beam of light from said source for projection through one of said lenses, a photoelectric cell, an amplifier, said photoelectric cell receiving light through another of said lenses, the output of said cell being connected to said amplifier, control means for said amplifier and said light source mounted on the rear wall of said housing, all of said elements being enclosed within said housing, a grid having multiple light passing slits positioned between said light source and said modulator, a second grid having similar light passing slits positioned between said modulator and said lens through which said light beam passes, and means accessible through said rear wall for adjusting said modulator to position the light beam passing through said grids.

4. A two-way light beam communication system, comprising a rectangularly shaped housing, a pair of lenses mounted in a front wall of said housing, a light source, a modulator, said modulator reflecting a beam of light from said source for projection through one of said lenses, a photoelectric cell, an amplifier, said photoelectric cell receiving light through another of said lenses, the output of said cell being connected to said amplifier, control means for said amplifier and said light source mounted on the rear wall of said housing, all of said elements being enclosed within said housing, a telescope within said housing, openings being provided in said front and rear walls to permit aligning the optical axes of said lenses with a distant point, and means for mounting said housing to permit the adjustment of said housing as indicated by said telescope.

MILFORD E. COLLINS.

REFERENCES CITED

The following references are of record in the file of this patent:

UNITED STATES PATENTS

| Number | Name | Date |
|---|---|---|
| 796,254 | Hartmann | Aug. 1, 1905 |
| 1,981,999 | French | Nov. 27, 1934 |
| 2,100,348 | Nicolson | Nov. 30, 1937 |
| 2,153,709 | Bournisien | Apr. 11, 1939 |
| 2,421,468 | Singer | June 3, 1947 |

FOREIGN PATENTS

| Number | Country | Date |
|---|---|---|
| 124,805 | Great Britain | Apr. 10, 1919 |